April 23, 1963  A. WINTER  3,086,633
POSITIVE ENGAGEMENT CLUTCH
Filed Aug. 11, 1960  2 Sheets-Sheet 1

Inventor:
AUGUST WINTER
ATTORNEY

April 23, 1963   A. WINTER   3,086,633
POSITIVE ENGAGEMENT CLUTCH
Filed Aug. 11, 1960   2 Sheets-Sheet 2

Inventor:
AUGUST WINTER
ATTORNEY

United States Patent Office 3,086,633
Patented Apr. 23, 1963

3,086,633
POSITIVE ENGAGEMENT CLUTCH
August Winter, Friedrichshafen, Germany, assignor to Zahnradfabrik Friedrichshafen Aktiengesellschaft, Friedrichshafen, Germany
Filed Aug. 11, 1960, Ser. No. 49,104
Claims priority, application Germany Aug. 13, 1959
6 Claims. (Cl. 192—53)

This invention relates to clutches of the positive engagement type and more particularly to a clutch having means to prevent manual force shifting prior to synchronization of speeds of elements to be coupled.

In prior art devices which utilize longitudinally sliding coupling pins for positively engaging between coupled parts there has existed a problem of wear and tear on the pins due to their being shifted from a rapidly moving shaft to a gear to be coupled to the shaft prior to the gear being brought up to shaft speed. Thus, with such lack of synchronization the pins rapidly rotate about the axis on the drive shaft, being keyed for rotation with the drive shaft, strike against mating parts carried by the gear to be coupled and due to the difference in rotational speeds between the gear and the shaft at the time of contact with the ends of the pins, damage and heavy wear result on the pin ends.

It is an object of the invention to provide a construction herein which prevents such damage by guarding against shifting of the pins by manual force until the shaft and gear to be coupled thereto are brought up to substantially the same speed.

It is another object of the invention to provide a construction whereby the coupling pins are given positive guidance throughout their length of sliding movement so that they enter into mating recesses in a gear to be coupled without being forced to tilt and without jamming.

Briefly, the invention comprises a clutch having a sleeve slidably splined to a driving shaft, which sleeve carries a plurality of arcuately spaced coupling pins which can be shifted actually to engage corresponding recesses in a gear. The sleeve which carries the pins is provided with grooves in which the pins slide and which grooves are carried in a formation of the sleeve which extends into an annular recess of a gear to be coupled. The annular recess has complementary grooves which register with the grooves in the sleeve and which grooves are engaged by the pins as they slide thereinto to effect locking engagement. Thus, the grooves in the sleeve insure positive guidance for the pins as they move endwise into engagement with the grooves in the gear. Further, each of the pins coacts with a spring biased ball detent which must be forced by manual shifting pressure out of corresponding recesses in the pins in order for the pins to slide. By providing that portion of the sleeve which extends into the gear with a frictional driving surface which engages a coacting surface in the gear, manual force exerted in the direction to shift the pins first effects engagement of these frictional surfaces whereby the sleeve, rotating with the power shaft, effects rotation of the gear. Since the spring bias acting against the ball detent is fairly heavy, it is necessary to provide considerable manual force in the initial axial shifting of the sleeve into frictional engagement with the gear before the balls can be pressed into released position with respect to respective pins. Such manual force insures tight frictional engagement of the frictional engaging surfaces and, therefore, brings the gear up to speed before the ball detents are actually pressed to released position. In short, the force necessary to overcome the spring bias of the balls must have a reaction support holding the balls relatively stationary axially relative to the direction of movement of the pins so that the pins can depress the balls which normally socket in recesses in the pins. Thus, initial shifting of the sleeve effects no ball release condition but such shifting movement is brought when the sleeve effects frictional engagement with the gear, and the sleeve now being axially stationary, continued manual force can force the ball detents out of locking position and thus effect shifting of the pins into the accommodating recesses of the gear.

A detailed description of the invention will now be given in conjunction with the appended drawing in which.

Figure 1:
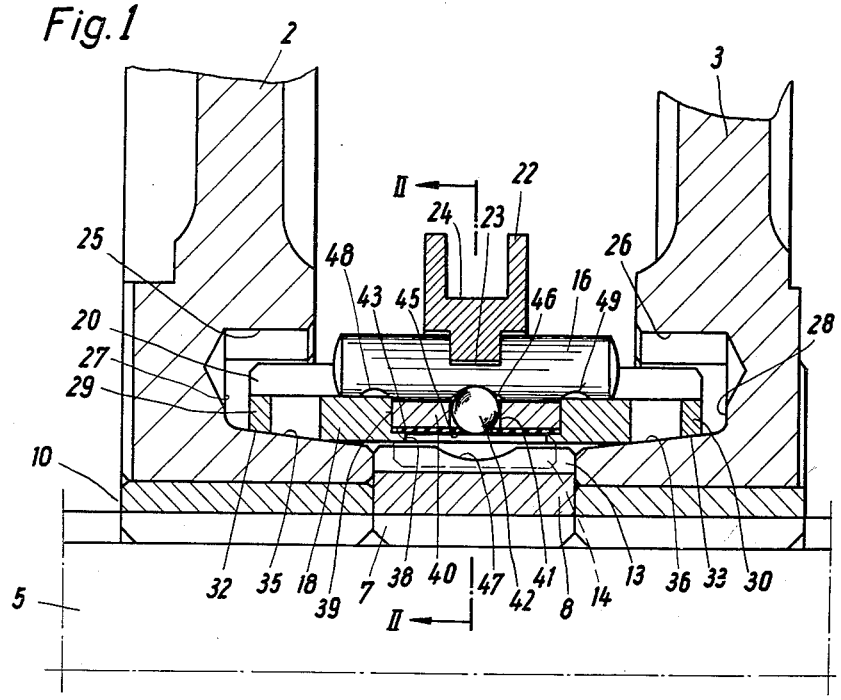
FIGURE 1 is a longitudinal cross section through a coupling device illustrating the invention.
Figure 2:
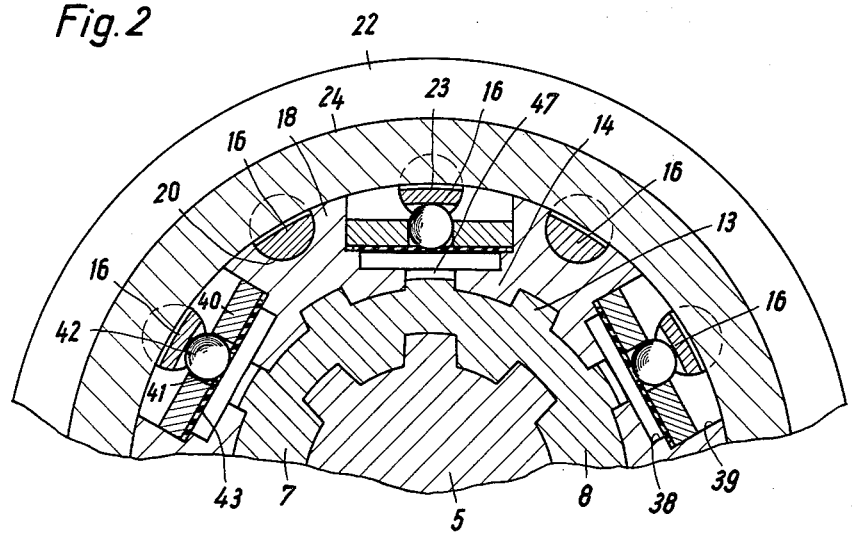
FIGURE 2 is a section through II—II of FIGURE 1.

Referring now to the form of the invention shown in FIGURES 1 and 2, a drive shaft 5 is disclosed to which by spline 7 a collar 8 is maintained in non-axially shifting position by additional collars, such as 10, splined on the shaft as shown. Slidably splined by splines 13 and 14 on collar 8 is a shifting sleeve 18, which sleeve is provided with grooves 20 running longitudinally on its exterior and which grooves carry respective clutch pins 16. Also carried on the shaft 5 rotatively with respect thereto are gears 2 and 3 to be driven by the shaft when coupled thereto by pins 16. The gears carry internal respective semi-circular grooves 25 and 26 which complete the circles of the complementary grooves 20 in sleeve 18 and match pins 16 which will be understood to be shiftable into respective grooves 25 or 26 depending on which gear is to be driven. It will be noted that the sleeve 18 thus extends on each side into the recesses 27 in gear 2 and 28 in gear 3 by virtue of the ring-like formations 29 and 30, which form the ends of sleeve 18, which will be clearly seen in FIGURE 1. The interior surfaces at the ends of the sleeve 18 are conically shaped to form frictional clutch surfaces 32 and 33 engageable with respective complementary conically shaped surfaces 35 and 36 on the hubs of gears 2 and 3. Accordingly, it will be understood that when sleeve 18 is shifted to the left, frictional drive engagement is had from shaft 5 to gear 2 via sleeve 18 and, likewise, by shifting sleeve 18 to the right, frictional drive engagement from the shaft to gear 3 is had. The pins are provided with slots 23 which engage an annular flange inside of a shifting ring 22, in the usual manner, which ring can be shifted by a yoke (not shown) in groove 24 for sliding the pins to the left or to the right by manual force.

In order to prevent the pins 16 from being moved by ordinary manual force into grooves 25, or 26, prior to synchronizing the speed of gears 2 or 3 with shaft 5, an arrangement is utilized comprising a series of discs 40, there being one such disc for alternate pins, as shown in FIG. 2. Each disc is carried in a bore 39 below each pin in sleeve 18 and seats on a shoulder 38 within the bore. Each disc is provided with a central opening 41 in which is disposed a ball 42 which rests against a disc spring 43, the bottom portion of each ball seating in an aperture 45 of each disc spring.

The pins are provided with a central groove 46 and with left and right end grooves 48 and 49. These grooves are semi-circular to conform to the shape of the balls. The springs 43 are sandwiched between respective discs 40 and shoulders 38. Below each ball there is a depression or cutout 47 in the splines 13 in order to accommodate the bulk of the ball when it is forced radially inward by virtue of the camming action of the respective grooves 46 in pins 16 when the pins are shifted either left or right.

Thus, it will be appreciated that forced shifting of the pins will push respective balls 42 radially inwardly to permit the pins to move full travel, guided by grooves 20, into engagement either with grooves 25 of gear 2 or grooves 26 of gear 3. However, the bias of springs 43 is such that when initial longitudinal force is brought to bear by means of the grooved wheel 22 on the pins, the pins together with sleeve 18 are shifted bodily without relative motion of the pins with respect to the sleeve. This brings the conical frictional internal surface of sleeve 18 into engagement with the mating surface of the gear hub, that is, surfaces 32 and 35 are frictionally engaged, for example, for gear 2, which causes the gear to be driven and thus to be brought up to speed to the shaft 5. In other words, the manual side thrust required to overcome the bias of springs 43 for forcing the balls out of the depressions 46 is such as to produce a full frictional drive between sleeve 18 and gear 2, assuming that this is the gear to be engaged, to thus effect a reaction support which prevents further leftward movement of sleeve 18. Accordingly, continued manual force on the pins forces the balls 42 out of locking engagement and the pins now slide into respective grooves 25 with very little relative rotary motion that would tend to damage them. Of course, slight rotary motion sufficient to bring the pins into axial alignment with grooves 25 is experienced but this is of no consequence insofar as damage or wear and tear is concerned.

The detent grooves 48 and 49 are provided to lock the pins into either extreme right-hand or left-hand position, respectively, by engagement with respective balls 42, as will be clearly understood from consideration of FIGURE 1.

Figure 3:
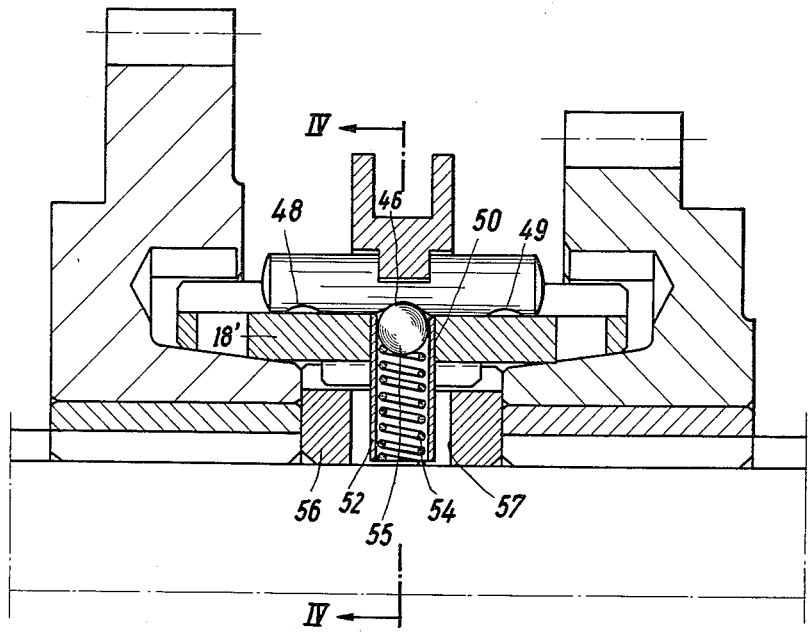
FIGURE 3 is a longitudinal section through a modification of the clutch.
Figure 4:
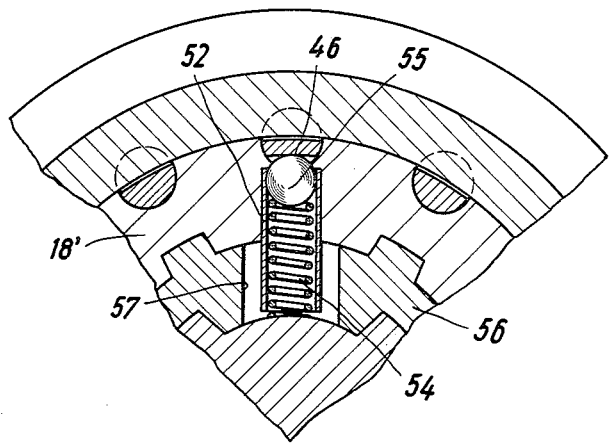
FIGURE 4 is a section through a modification of the clutch, as shown in FIGURE 3, through IV—IV.

In the form of the invention, as shown in FIGURES 3 and 4, the sleeve 18' is generally similar to the sleeve 18 of FIGURE 1 and in fact all of the components are the same except for the ball support arrangement. In this case, the collar 56 carried on the main drive shaft is provided with a respective bore 57 for accommodating a tube or a sleeve 52 which houses a helical spring 54, the helical spring having support against the shaft, as shown at its lower end. The upper end of the spring bears against a ball 55 which coacts with detent notches or grooves 46, 48 and 49 provided in the shaft pin, all as heretofore described. The sleeve 52 will be seen to be carried in a bore 50 in sleeve 18' and will be understood to be secured to sleeve 18' within that bore. It will also be understood that due to the large size of bore 57, as compared with sleeve 52, sleeve 18' is provided with sufficient movement, either to the left or to the right as desired, for gear engagement.

The operation of the form of the invention is the same in function and effect as that hereinabove described for FIGURES 1 and 2.

Having thus described my invention, I am aware that changes may be made without departing from the spirit thereof and thus is not to be restricted to illustrations herein given, except as set forth in the appended claims.

What is claimed is:

1. A positive connection clutch comprising a shaft, a pair of spaced elements rotatively carried on said shaft to be coupled thereto, a collar splined to said shaft disposed intermediate said elements, a shifting sleeve slidably splined on said collar, said sleeve and said elements having engageable frictional drive surfaces effective to establish a drive connection between said shaft and either of said elements for initially synchronizing the speeds thereof upon manual shifting of said sleeve to effect a frictional driving engagement: positive driving connection clutch pin means carried on said sleeve and reciprocal with respect thereto to positively engage either element for effecting positive drive connection with said shaft, detent means disposed intermediate said clutch pin means and said sleeve, and resilient means acting on said detent means for effecting engagement thereof with said clutch pin means to lock said sleeve and said clutch pin means for preventing relative motion therebetween until said frictional engagement of said sleeve and either element prevents further shifting of said sleeve toward said element when substantial synchronization of speeds of said shaft and said element is realized, continued manual shifting force overcoming said resilient means to move said detent means out of locking engagement with said sleeve whereby said clutch pin means may be shifted with respect thereto to effect positive drive connection with said element, said clutch pin means comprising at least one pin having a notch therein, said detent means comprising a ball engageable in said notch to lock said pin, said ball being carried by said shifting sleeve, said resilient means comprising a spring disc engaging said ball, said sleeve having a bore therein, a ball guide member in said bore having an aperture in which said ball is guided, said spring disc being disposed in said bore.

2. A positive connection clutch comprising a shaft, a pair of spaced elements rotatively carried on said shaft to be coupled thereto, a collar splined to said shaft disposed intermediate said elements, a shifting sleeve slidably splined on said collar, said sleeve and said elements having engageable frictional drive surfaces effective to establish a drive connection between said shaft and either of said elements for initially synchronizing the speeds thereof upon manual shifting of said sleeve to effect a frictional driving engagement: positive driving connection clutch pin means carried on said sleeve and reciprocal with respect thereto to positively engage either element for effecting positive drive connection with said shaft, detent means disposed intermediate said clutch pin means and said sleeve, and resilient means acting on said detent means for effecting engagement thereof with said clutch pin means to lock said sleeve and said clutch pin means for preventing relative motion therebetween until said frictional engagement of said sleeve and either element prevents further shifting of said sleeve toward said element when substantial synchronization of speeds of said shaft and said element is realized, continued manual shifting force overcoming said resilient means to move said detent means out of locking engagement with said sleeve whereby said clutch pin means may be shifted with respect thereto to effect positive drive connection with said element, said detent means comprising a ball, said resilient means comprising a spring disc, said sleeve having a bore and an annular shoulder extending thereinto, said disc being supported on said shoulder, and a ported plate disposed on said spring disc and being fully receivable within said bore, said ball being guidedly and movably disposed within said ported plate.

3. A positive connection clutch comprising a shaft, a pair of spaced elements rotatively carried on said shaft to be coupled thereto, a collar splined to said shaft disposed intermediate said elements, a shifting sleeve slidably splined on said collar, said sleeve and said elements having engageable frictional drive surfaces effective to establish a drive connection between said shaft and either of said elements for initially synchronizing the speeds thereof upon manual shifting of said sleeve to effect a frictional driving engagement: positive driving connection clutch pin means carried on said sleeve and reciprocal with respect thereto to positively engage either element for effecting positive drive connection with said shaft, detent means disposed intermediate said clutch pin means and said sleeve, and resilient means acting on said detent means for effecting engagement thereof with said clutch pin means to lock said sleeve and said clutch pin means for preventing relative motion therebetween until said frictional engagement of said sleeve and either element prevents further shifting of said sleeve toward said element when substantial synchronization of speeds of said shaft and said element is realized, continued manual shifting force overcoming said resilient means to move said detent means out of locking engagement with said sleeve whereby said clutch pin means may be shifted with respect thereto to effect positive drive connection with said element, said detent means comprising a ball and a plurality of notches in said clutch pin engageable by said ball to hold said clutch pin in selective positions.

4. A positive connection clutch comprising a shaft, a pair of spaced elements rotatively carried on said shaft to be coupled thereto, a collar splined to said shaft disposed intermediate said elements, a shifting sleeve slidably splined on said collar, said sleeve and said elements having engageable frictional drive surfaces effective to establish a drive connection between said shaft and either of said elements for initially synchronizing the speeds thereof upon manual shifting of said sleeve to effect a frictional driving engagement: positive driving connection clutch pin means carried on said sleeve and reciprocal with respect thereto to positively engage either element for effecting positive drive connection with said shaft, detent means disposed intermediate said clutch pin means and said sleeve, and resilient means acting on said detent means for effecting engagement thereof with said clutch pin means to lock said sleeve and said clutch pin means for preventing relative motion therebetween until said frictional engagement of said sleeve and either element prevents further shifting of said sleeve toward said element when substantial synchronization of speeds of said shaft and said element is realized, continued manual shifting force overcoming said resilient means to move said detent means out of locking engagement with said sleeve whereby said clutch pin means may be shifted with respect thereto to effect positive drive connection with said element, said clutch pin means comprising at least one pin having a notch therein, said detent means comprising a ball engageable in said notch to lock said pin, said ball being carried by said shifting sleeve, said resilient means comprising a spring disc engaging said ball, said sleeve having a bore therein, a ball guide member in said bore having an aperture in which said ball is guided, said spring disc being disposed in said bore.

5. A positive connection clutch comprising a shaft, a pair of spaced elements rotatively carried on said shaft to be coupled thereto, a collar splined to said shaft disposed intermediate said elements, a shifting sleeve slidably splined on said collar, said sleeve and said elements having engageable frictional drive surfaces effective to establish a drive connection between said shaft and either of said elements for initially synchronizing the speeds thereof upon manual shifting of said sleeve to effect a frictional driving engagement: positive driving connection clutch pin means carried on said sleeve and reciprocal with respect thereto to positively engage either element for effecting positive drive connection with said shaft, detent means disposed intermediate said clutch pin means and said sleeve, and resilient means acting on said detent means for effecting engagement thereof with said clutch pin means to lock said sleeve and said clutch pin means for preventing relative motion therebetween until said frictional engagement of said sleeve and either element prevents further shifting of said sleeve toward said element when substantial synchronization of speeds of said shaft and said element is realized, continued manual shifting force overcoming said resilient means to move said detent means out of locking engagement with said sleeve whereby said clutch pin means may be shifted with respect thereto to effect positive drive connection with said element, said shifting sleeve being provided with a plurality of angularly spaced bores having shoulders therein, said resilient means comprising a flexible spring disc in each bore, a ball guide disc in each bore disposed on respective spring discs and having an aperture therethrough, said detent means comprising respective balls in said apertures biased by respective spring discs into engagement with respective clutch pin means.

6. A positive connection clutch comprising a shaft, a pair of spaced clutch elements carried rotatively on said shaft to be coupled thereto, a collar splined to said shaft intermediate said elements, a reversibly shiftable sleeve slidably carried on said collar, a recess in each of said clutch elements having a conically tapered longitudinally extending surface frictionally engageable by a respective complementary conically tapered surface at each end of said sleeve for effecting synchronization by frictional drive between said shaft and said clutch elements, said ends of said sleeve extending into respective recesses, a plurality of grooves carried on the periphery of said shiftable sleeve and a respective clutch pin in each of said grooves, the recesses of said clutch elements being provided with grooves alignable with the grooves of said shiftable sleeve whereby said clutch pins may slide into said clutch element grooves and thus rotatively lock said sleeve to either of said clutch elements and wherein said clutch pins are fully supported at all times in the grooves of said sleeve, a detent means comprising a spring pressed detent carried by said shiftable sleeve for each of said clutch pins and resiliently engaging a centrally disposed notch therein when said clutch pins are not in engagement in the grooves of either of said clutch elements, each of said clutch pins having a notch adjacent a respective end engageable by the detent when said clutch pins are shifted into locking engagment with one or the other of said clutch elements to thereby maintain said locking engagement.

References Cited in the file of this patent

UNITED STATES PATENTS

| | | |
|---|---|---|
| 2,017,591 | Dumm | Oct. 15, 1935 |
| 2,221,894 | White | Nov. 19, 1940 |
| 2,504,409 | Haefeli | Apr. 18, 1950 |
| 2,547,732 | Baker | Apr. 3, 1951 |
| 2,882,704 | Quackenbush | Apr. 21, 1959 |

FOREIGN PATENTS

| | | |
|---|---|---|
| 227,053 | Switzerland | Aug. 2, 1943 |
| 1,124,334 | France | June 25, 1956 |